Jan. 11, 1927.
J. J. CATRON
1,613,934
FLUID DISPENSER
Filed Sept. 29, 1923    5 Sheets-Sheet 1
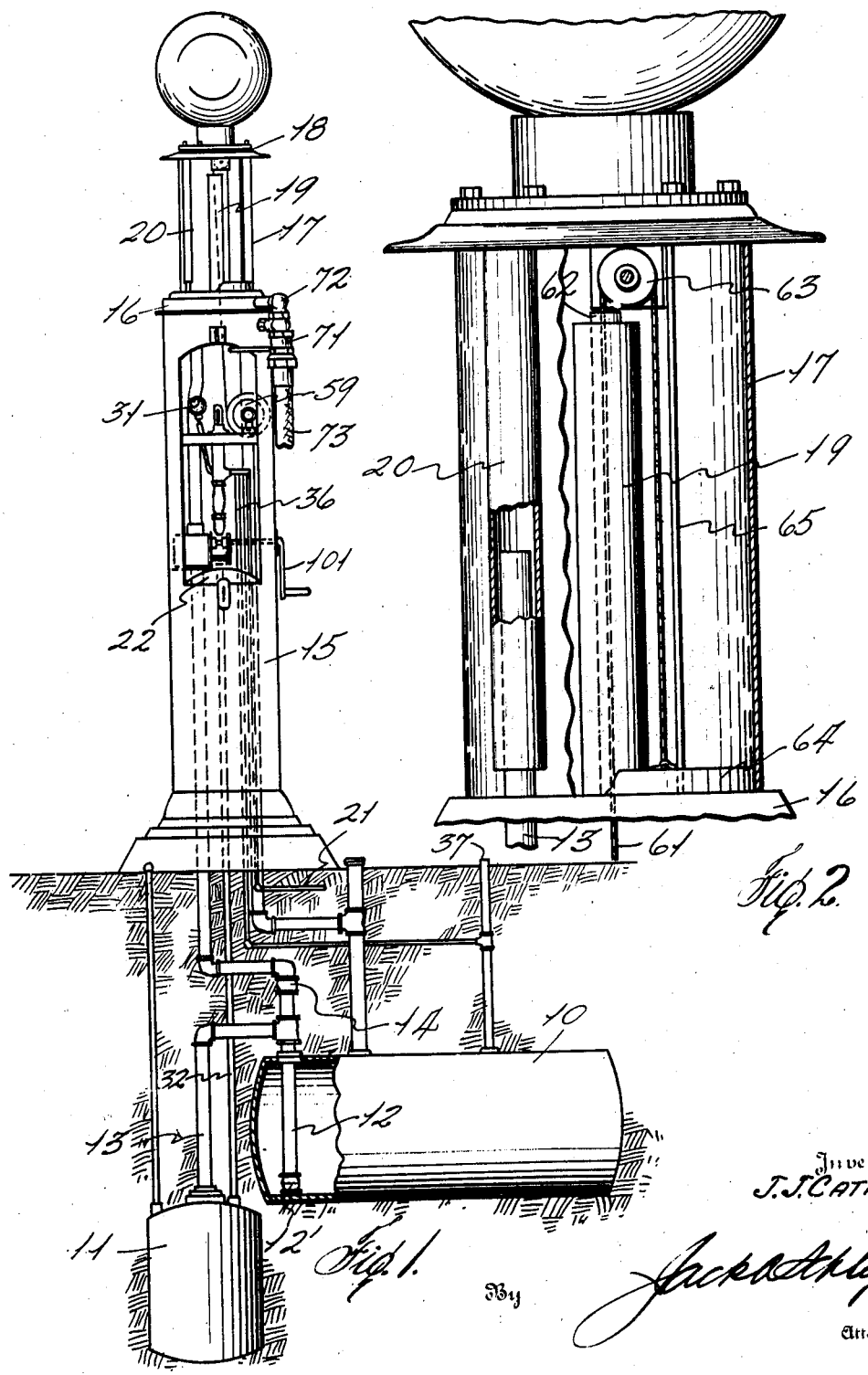

Jan. 11, 1927. 1,613,934
J. J. CATRON
FLUID DISPENSER
Filed Sept. 29, 1923 5 Sheets-Sheet 2

Inventor
J. J. Catron
Attorney

Jan. 11, 1927. 1,613,934
J. J. CATRON
FLUID DISPENSER
Filed Sept. 29, 1923 5 Sheets-Sheet 3

Inventor
J. J. Catron

By Jack A. Ashley
Attorney

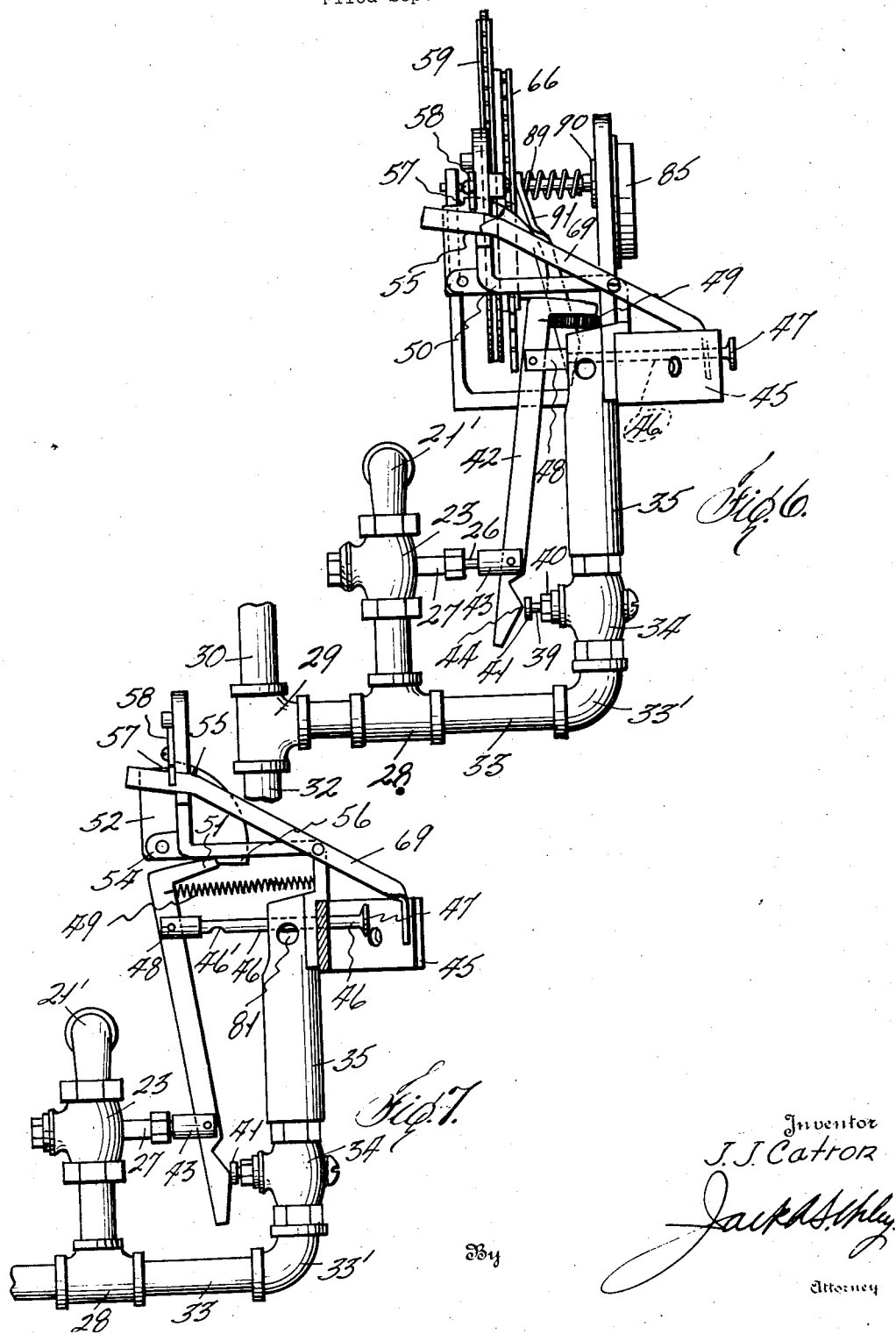

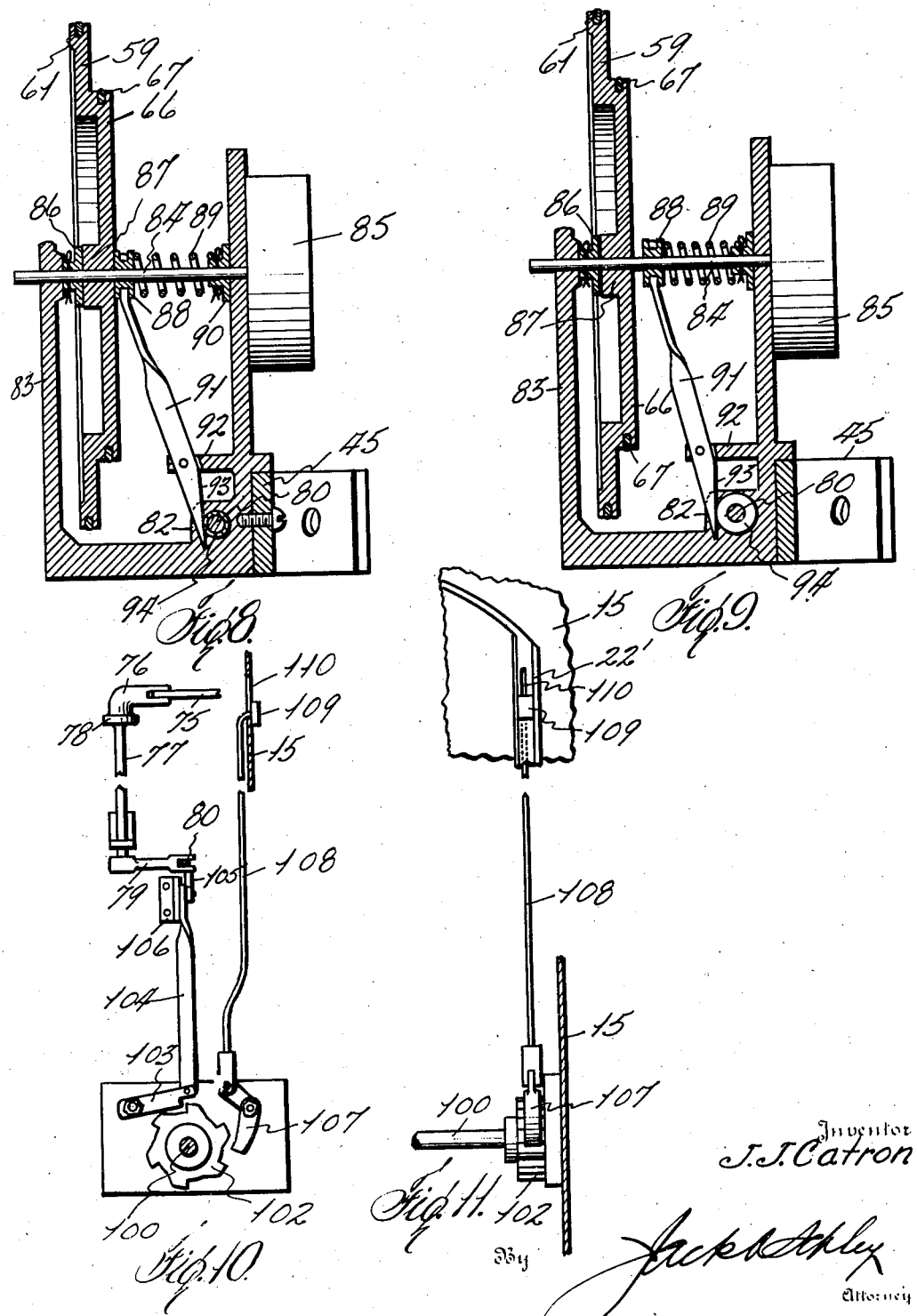

Patented Jan. 11, 1927.

1,613,934

UNITED STATES PATENT OFFICE.

JOHN J. CATRON, OF BONHAM, TEXAS, ASSIGNOR TO CATRON MANUFACTURING COMPANY, OF BONHAM, TEXAS, A CORPORATION OF TEXAS.

FLUID DISPENSER.

Application filed September 29, 1923. Serial No. 665,582.

This invention relates to new and useful improvements in fluid dispensers.

The object of the invention is to couple an indicator with a meter in such a manner that the meter is driven in unison with the indicator, but is automatically disconnected when the indicator is reversed in refilling the receptacle.

An important object of the invention is to provide a clutch controlled by the dispensing valve, whereby the transmission of motion to the meter is interrupted when the dispensing valve is closed.

Another object is to provide an indicator operated by a float and a meter connected so that when the float is elevated in filling the measuring receptacle the meter will be disconnected and will not register.

A further object is to provide a meter clutch arranged to disconnect the meter when the supply valve is operated to fill the measuring receptacle.

A construction designed to carry out the invention together with various other novel features of the invention will be hereinafter more fully described.

The invention will be more readily understood from a reading of the following specification and by reference to the accompanying drawings, in which an example of the invention is shown and wherein:—

Figure 5:
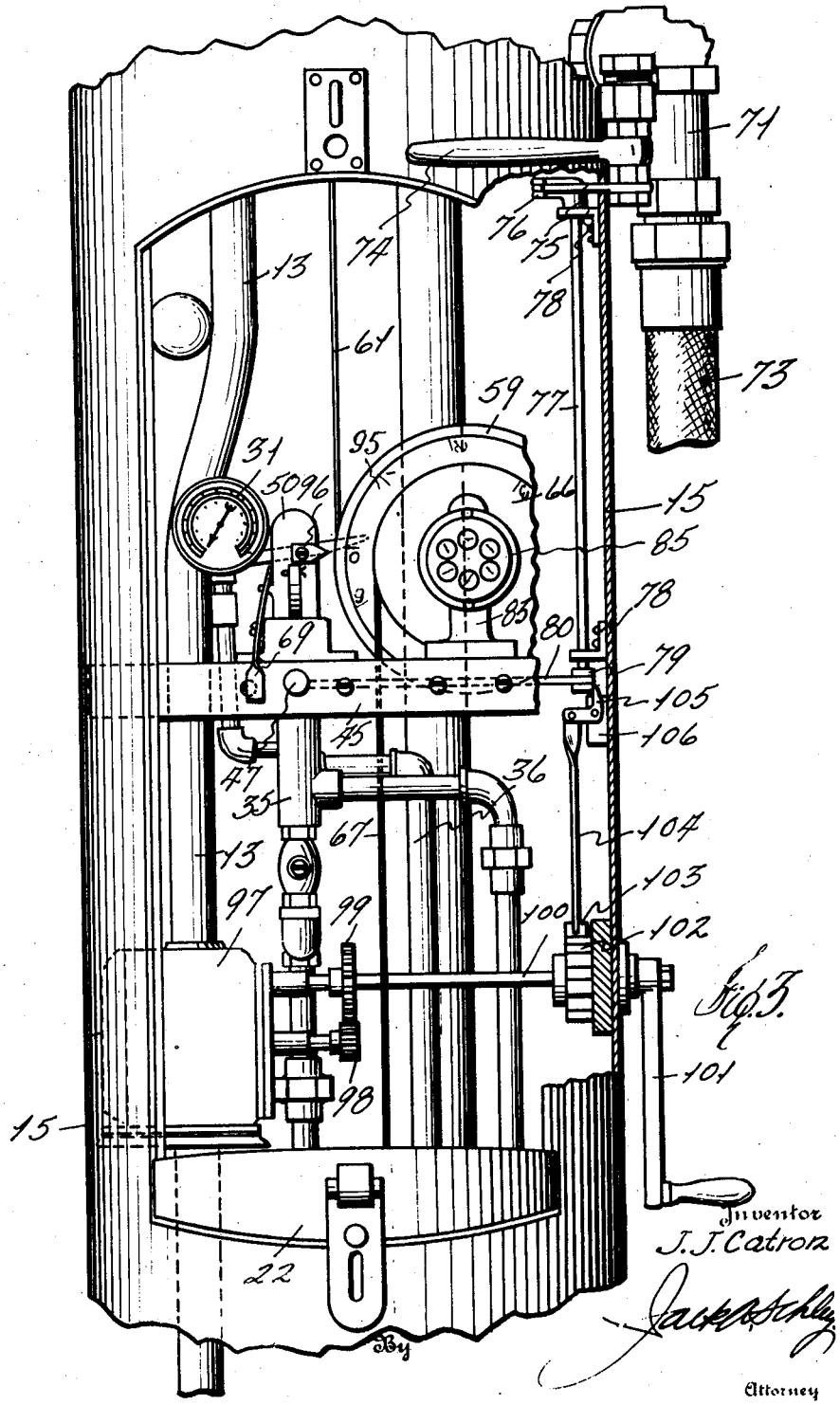
Figure 4:
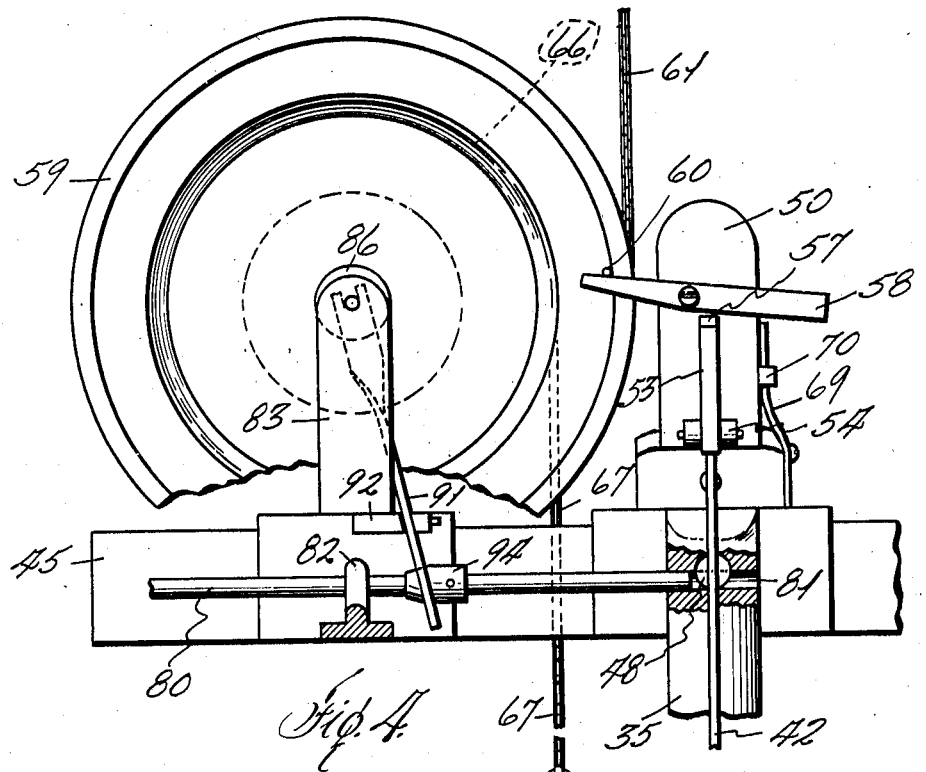
Figure 5:
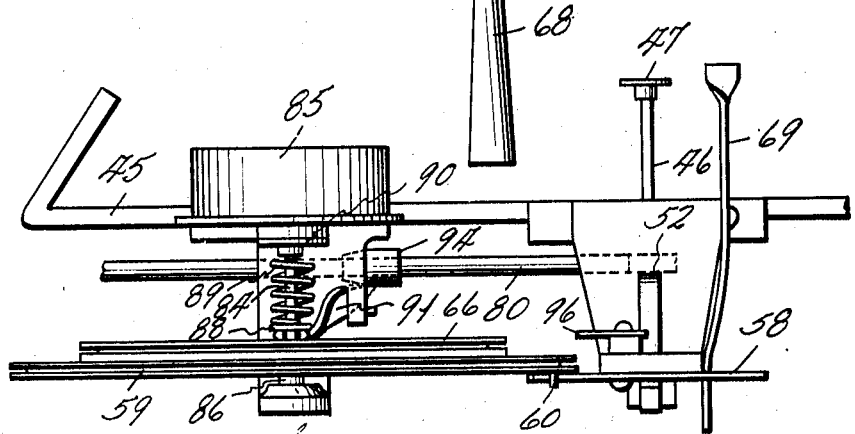

Fig. 1 is an elevation of a fluid dispenser constructed in accordance with my invention, Fig. 2 is an enlarged view of the visible measuring receptacle and float, Fig. 3 is an enlarged view of the upper portion of the cabinet and the operating parts therein, Fig. 4 is a rear elevation of the indicating dial and control locking means, Fig. 5 is a plan view of the same, Fig. 6 is a side elevation of the supply controlling means in its closed position, Fig. 7 is a side elevation of the same parts in their opened position, Fig. 8 is an enlarged sectional view transversely of the indicating wheel and clutch parts, the meter being clutched, Fig. 9 is a similar view, the meter being unclutched, Fig. 10 is a side elevation of the hand pump locking means, and Fig. 11 is a front elevation of the same.

In the drawings the numeral 10 designates an underground storage tank and 11 a pressure tank. A liquid supply pipe 12 leads from the tank 10 and is connected by a branch pipe 13 with the pressure tank, the latter being below the tank 10 and siphoning the liquid therefrom. The supply pipe has a check valve 12' at its lower end in the tank 10 and another check valve 14 just above the connection with the branch pipe 13, in which other check valves may be included. The supply pipe 13 extends up through a cabinet 15 to the base 16 of a visible measuring receptacle which includes a glass cylinder 17 and a cap 18. An overflow pipe 19 leads from a point in the receptacle down through the cabinet to the tank 10. The upper end of the supply pipe terminates in a sleeve 20 (Fig. 2) open in the receptacle at its lower end, whereby the fluid flows into the receptacle, free from bubbles and excessive agitation.

Compressed air is supplied from a suitable source by means of a pipe 21 which extends up through the cabinet 15. One of the features of the device is to maintain the storage tank free from pressure of air. The pipe 21 is turned laterally in the upper portion of the cabinet. At this portion the cabinet has a sliding door 22, which when opened gives access to the mechanism within. The lateral extension of the pipe 21, is connected by an elbow 21' (Figs. 6 and 7) with an air supply valve 23. The supply control is included in my co-pending application filed of even date herewith. The valve 23 is of the spring seating type and has a stem 26 extending through a guide nipple 27 on the valve casing. The spring holds the valve normally seated.

The valve 23 is connected with a horizontal T 28 which is connected with a vertical T 29. A gauge pipe 30 extends upwardly from the T 29 and has an air pressure gauge 31 at its upper end (Figs. 1 and 3). An air supply pipe 32, forming a continuation of the pipe 21 leads down through the cabinet from the T 29 and extends into the tank 11. This pipe supplies compressed air to elevate the liquid through the pipes 13 to the cylinder 17.

It is obvious that whenever the valve 23 is closed, after being operated, there will remain suspended in the pipe 13, the liquid which has not been discharged into the cylinder 17 and also there will be a pressure of air in the tank 11. In order to relieve this pressure, the trapped air is released. For this purpose a short pipe 33 extends forwardly from the T 28 and is connected by an elbow 33' with an air release valve 34. A casting 35 having an elbow at its lower end is connected with the valve. A release pipe 36 suitably directed, leads from the casting down through the cabinet to an upright vent pipe 37 extending from the storage tank 10.

The air release valve includes a free seating valve head and a stem 39 extending through a cap 40 and carrying a button 41 on its outer end. The valves 23 and 34 are disposed with their stems 26 and 39 directed toward each other and the stem 26 a short distance above the stem 39. When the air supply valve 23 is closed the air unseats the valve 34 and escapes from the pipe 32.

Means is provided for operating the valves in common, so that the operator is required to use only one hand for the purpose. In carrying out this feature means is provided for operating the valves in tandem and includes an upright lever 42 pivoted above its lower end in a head 43 mounted on the outer end of the stem 26. The lower edge of the lever has a fulcrum boss 44 shaped with an apex to ride on the button 41.

The casting 35 is secured to a transverse supporting bar 45 which has its ends bent and fastened in the cabinet. The elbow of the pipe 36 is included in this cabinet merely as a matter of convenience. A plunger 46 is slidably mounted in the bar and casting, and has a button 47 on its forward end in front of the bar. On its rear end the plunger has a head 48 in which the upper portion of the lever 42 is pivoted. A coiled spring 49 has one end attached to the lever above the head 48 and its other end connected with a bracket 50 mounted on the casting. When the plunger is pressed inwardly by means of the button 47 the spring 49 is placed under tension, so that when the plunger is released the spring returns the lever.

When the plunger 46 is depressed, the coiled spring 49 is placed under tension, but the valve 23 is not at first opened. This causes the lever 42 to swing in the head 43 and the boss 44 to engage the button 41 and seat the valve 34 before the stem 26 is depressed. By this arrangement the release valve is closed during the initial movement of the lever and prior to the opening of the air valve 23. A continued movement of the plunger causes the boss 44 to fulcrum upon the button 41, whereby the lever changes its fulcrum point and depresses the stem 26, which unseats the valve 23, thus permitting air to pass to the pipe 32.

In order that the operator need not hold the plunger depressed while the measuring receptacle is filling, a finger 51 is mounted on the upper end of the lever. This finger is directed forwardly and rides under a quadrant latch 52 swinging in a slot 53 in the bracket and pivoted between ears 54 on the rear end of the bracket. The upward and rearward swinging movement of the quadrant is limited by a pin 55. The quadrant has a lug 56 on its bottom and this rests upon the finger. When the lever is swung rearwardly to open the air supply valve 23 the finger rides under the lug and finally passes the same, which latter drops in front of the finger and locks the lever in the "open" position, as is shown in Fig. 7.

On the rear end of the quadrant a shoulder 57 is cut to receive a latch bar 58 pivoted on the rear side of the bracket. When the lug drops in front of the finger 51 the latch bar drops behind the shoulder 57. The upper surface of the finger is rounded and the rear edge of the lug is bevelled. When the lever 42 is swung the spring 49 is placed under tension and thus when the latch bar is lifted, the finger impelled by said spring, will displace the quadrant upwardly, leaving the lever free to return, so that the air supply valve 23 may close. For tripping the latch bar 58 two means are shown, but it is to be understood that various means for locking the lever as well as numerous means for tripping, may be evolved and the invention is not to be limited to the means shown and described.

It is to be understood that while I have illustrated the invention in connection with an air pressure fluid supply and control for elevating the liquid to the receptacle 17, any means may be operated by the plunger to control the supply of liquid to the receptacle.

An important element of the invention is a movable indicator employed to indicate the number of gallons dispensed as the liquid is discharged from the receptacle 17 and also to operate the meter, as well as to trip the plunger and cut off the supply of liquid, when the receptacle is full.

For this purpose a measure indicating dial or wheel 59 is mounted to the right (Fig. 3) of the latch bar 58 and has a pin 60 (Figs. 4 and 5) on its rear side. This wheel has one end of a flexible connection 61 wound thereon. This connection 61 passes up through the base 16 and through a tube 62 to a pulley 63 suspended in the top of the measuring receptacle (Fig. 2). The connection 61 passes over the pulley and down to a float 64 slidable in the cylinder 17 on a vertical guide rod 65. The wheel 59 has a grooved drum 66 concentrically mounted on its face and from the same side as the connection 61, a flexible connection 67 hangs from the drum. A counterweight 68 is attached to the connection 67 and acts to counter-balance the float 64 and by unwinding from the drum 66, when said float is elevated, revolves said wheel in a counterclockwise direction, whereby the connection 61 is wound thereon.

When the float approaches the top of the cylinder the pin 60 approaches the end of the bar 58 and as the float finishes its upward movement the pin depresses the latch bar, which is thus lifted from the shoulder 57 and the quadrant 52 is thereby released. Thus when the cylinder is filled to the required level, the supply valve 23 is closed. In case it is desired to trip the bar 58 when the cylinder has been partially filled, a finger lever 69 is depressed. This lever is pivoted on the side of the bracket 50 and has its forward end turned down near the button 47; while its rear end rests on a lug 70 extending from the side of the bracket. The quadrant is between the pivot of the latch bar 58 and the lever 69. When said lever is depressed its rear end is elevated and engages the bar 58, thus swinging the same from the shoulder 57, whereby the quadrant is released.

The receptacle 17 has a dispensing valve 71 suitably connected therewith by a pipe 72 connected through the base 16. A hose 73 is suitably connected with the dispensing valve. This valve may be of any approved type and has a hand lever 74. A link 75 is eccentrically connected to the hand lever so as to be moved inwardly when the valve is opened. The link extends through a slot in the cabinet and is connected with a crank arm 76 (Figs. 3 and 10) fastened on the upper end of a vertical rock shaft 77 supported in brackets 78 on the inside of the cabinet 15.

On its lower end the shaft has a laterally directed arm 79 having its outer end forked and pivotally connected with a transverse lock bar 80 (Figs. 4 and 5). The inner end of the bar 80 rests in an aperture 81 in the upper end of the casting 35 and passes through a lug 82 on a bracket yoke 83 fastened to the cross bar 46. The plunger 46 has a notch 46' (Fig. 7) which registers with the aperture 81 when the plunger is in its normal position. When the lever 74 is swung to open the dispensing valve 71 the link 75 is pushed inwardly, whereby the shaft 77 is rocked to slide the lock bar 80 into the notch 46' of the plunger 46, and consequently the plunger cannot be depressed when the dispensing valve 71 is opened. This prevents the operation of the liquid supply, while liquid is being dispensed.

A horizontal shaft 84 is mounted in the yoke 83 and has suitable operating connection with a meter 85 mounted on the front of the yoke (Figs. 8 and 9). A friction clutch disk 86 is fastened on the shaft and abuts the rear upright of the yoke. The wheel 59 is journaled on the shaft and has a clutch hub 87 having a friction face for contacting with the disk 86. A grooved collar 88 loose on the shaft, is positioned to engage the front end of the hub and is impelled by a coiled spring 89 surrounding the shaft between the collar and a thrust disk 90.

The spring forces the collar against the hub 87 and the latter is thus frictionally engaged with the disk 86, whereby the shaft 84 is turned when the wheel 59 is revolved, motion thus being imparted to the meter 85. A clutch lever 91 is pivoted intermediate its ends on a finger 92 of the yoke. The upper end of the lever is forked and engages in the grooved collar 88. The lever is twisted upon itself to present its edge, the portion 93 of which is beveled. An annular cam 94 is fastened on the lock bar 80 and the beveled edge 93 engages the inclined face of said cam (Figs. 4 and 5).

When the bar 80 is moved inwardly to lock the plunger 46, the cam is moved so that the edge 93 rides down the inclined face to the reduced end of said cam and the lever 91 is swung by the spring 89 and collar 88 to engage the clutch hub 87 with the disk 86, as is shown in Fig. 8. Thus when the dispensing valve 71 is opened the wheel 59 is coupled with the meter 85 and is revolved by the unwinding of the connection 61. The wheel has designations or symbols 95 equally spaced thereon in counter-clockwise order. In the present instance 0 to 10 are employed indicating gallons and the capacity of the receptacle 17. These register with a pointer 96 as the wheel is revolved.

When the lever 74 is swung to close the dispensing valve the shaft 77 is rocked to move the bar 80 out of the notch 46' and this causes the cam 94 to ride along the edge 93 of the lever 91 and move the same outward, whereby the upper end of the lever is swung to slide the collar 88 out of contact with the hub 87, thus unclutching the wheel 59 and the shaft 84. The plunger 46 is released by this movement of the bar 80 and when the wheel is revolved in filling the receptacle, the meter will not be operated or disturbed. It will be seen that should an attempt be made to swing the hand lever 74 to open the valve 71, while the plunger was depressed and the receptacle is being filled, the bar 80 would abut the plunger and stop further movement of the lever 74.

In some instances it is desirable to operate the dispenser with a hand pump and for this purpose a rotary pump 97 is coupled in the pipe 13 and has a pinion 98 on the outer end of its shaft. This pinion is driven by a gear 99 fastened on a transverse shaft 100 extending through the side of the cabinet 15. A crank handle 101 is detachably secured on the end of the shaft 100. When the hand pump is not used, the handle is removed.

On the shaft 100 is fastened a toothed wheel 102 on the inside of the cabinet as is shown in Figs. 3, 10 and 11. A locking dog 103 is pivoted inside the cabinet over the wheel and has its swinging end pivoted to the lower end of a link 104. The link has its upper end pivoted to the horizontal leg of a bell-crank lever 105 pivoted on a bracket 106. The lever 105 (Fig. 3) has its vertical leg in the path of the arm 79.

When the dispensing valve is opened and the arm 79 swung inwardly the dog 103 is permitted to fall into one of the teeth of the wheel 102, which is thus locked against rotation for operating the pump. When the dispensing valve is closed the arm 79 is swung outwardly and engages the lever 105 which is thus swung and this raises the dog and frees the wheel. When the cabinet is closed the door 22 is raised. A block 109 in one of the guide channels 22' of the door is slid upwardly by the door and elevates a rod 108 connected with the block through a slot 110 in the said channel. The rod swings a pawl 107 into the tooth of the wheel 102 and the shaft 100 cannot be rotated to operate the pump until the door is opened.

In operating the dispenser the operator places his thumb on the button 47 with the parts in the position shown in Figs. 4, 5, 6 and 9. In this position the air supply valve 23 is closed and the air release valve 34 is open. The operator depresses the plunger 46 which swings the lever 42. The valve 23 resists the initial movement of the lever and consequently the lever fulcrums in the head 43 of the valve, which remains seated. This causes the boss 44 to engage the button 41 and seat the valve 34. After the valve 34 is seated the lever changes its fulcrum point to the boss 44 and the valve 23 is unseated by the continued movement of the plunger.

As the depression of the plunger is continued, the spring 49 is tensioned and the finger 51 rides under the lug 56 and comes to rest in rear of the beveled edge of the same. At the same time the bar 58 drops behind the shoulder 57 as is shown in Fig. 7. With the parts in this position the air supply valve is held open. The operator may remove his thumb from the button 47. Compressed air is conveyed by the pipe 32 to the tank 11 from which it elevates the liquid through the pipes 13 to the measuring receptacle, whereby the cylinder 17 is filled to the top of the overflow pipe 19. As the cylinder is filled the float 64 (Fig. 2) rises and wheel 59 is revolved in a counter-clockwise direction by the unwinding of the connection 67 from the drum 66.

Should it be desired to close the air supply valve and only partially fill the receptacle, the operator has merely to depress the finger lever 69, which in turn swings the latch bar 58 upward from the shoulder 57 and releases the quadrant latch 52. If the receptacle is permitted to fill the pin 60 on the wheel 59 will engage the bar 58 and swing the same to trip the quadrant. As the connection 67 is unwound from the drum, the connection 61 is wound on the wheel 59.

Just as soon as the latch bar 58 is raised the tension of the spring 49 causes the finger 51 to ride off the lug 56, which is displaced upward so that the bar 58 drops upon the arcuate edge of said quadrant. The spring 49 returns the lever 42 and the plunger 46 to their normal positions. During the first part of the return movement the boss 44 fulcrums on the button 41 and the valve 23 is first closed. After the valve 23 is seated the fulcrum point changes to the head 43 and the pressure on the button 41 is relieved, which permits the release valve 34 to open. This releases the trapped air which escapes through the pipes 36 and 37.

When it is desired to dispense the liquid from the receptacle the hand lever 74 is swung to open the dispensing valve 71, which permits the liquid to pass out through the hose 73. When the lever 74 is swung the link 75 rocks the shaft 77 which in turn swings the arm 79 inward, whereby the lock bar 80 is moved inwardly and its end engaged in the notch 46' of the plunger, thus locking the same against depression and preventing the operation of the liquid supply when the dispensing valve is opened. When the shaft 77 is rotated and the arm 79 swung inward, the bell crank lever 105 will be released, so that if the dispenser was being operated with the hand pump 97, the dog 103 would be dropped into the teeth of the wheel 102 and the operation of the pump prevented.

When the bar 80 is slid inward the cam 94 is moved thereby and the edge 93 of the lever rides down the face of said cam, whereby the spring 89 forces the collar 88 against the hub 87 and causes the latter to frictionally engage the face of the disk 86. This clutches the wheel 59 and the shaft 84 and as the liquid runs out of the receptacle the float 64 is lowered and the connection 61 is unwound from the wheel which is thus revolved in a clock-wise direction. As the wheel is revolved the connection 67 is wound on the drum 66 and the weight 68 is elevated. The clutched position is shown in Fig. 8.

The revolving of the wheel 59 operates the meter 85 through the turning of the shaft 84 and as the symbols 95 register with the pointer 96, the quantity of liquid dispensed is measured, indicated and recorded. This enables the operator to close the dispensing valve 71 when the desired number of gallons have been discharged, which will be shown by the indicator wheel and therefore he is not required to observe the cylinder 17 or graduations thereon and the measurement will be exact.

When the desired quantity of liquid has been dispensed the handle 74 is swung to close the valve 71 and this pulls the link 75, whereby the shaft 77 is rocked to move the bar 80 out of the notch 46' and to slide the cam 94 so as to swing the lever 91 to the position shown in Fig. 9. This unclutches the meter and releases the plunger 46. This operation also causes the arm 79 to swing the lever 105 and raise the dog 103, which frees the wheel 102 and the hand pump 97.

It is obvious in an invention of such an elaborate nature as that herein set forth, many constructions may be worked out. As before recited the plunger or its equivalent may be employed to set in motion any kind of a liquid supply means. Various kinds of movable indicators could be evolved to register the dispensations and trip the fluid supply means. The details of the clutch between the indicator and the meter are subject to considerable variation. In carrying out these changes and alterations and modifications, all such are included as come within the scope of the appended claims.

What I claim is:

1. In a fluid dispenser, the combination of a measuring receptacle, a valved filling means therefor, a float in the receptacle, a movable measure indicator connected with and operated by the float, a liquid dispensing valve connected with the receptacle independently of the filling means, a normally inoperative meter, means operated by the dispensing valve when the latter is opened for coupling the indicator and meter, and a lock cooperating with said coupling means and controlled by the said operating means for preventing the operation of the meter when the receptacle is being filled.

2. In a fluid dispenser, the combination of a movable measure indicator, a receptacle for the liquid, means for operating the indicator when liquid is dispensed from the receptacle, a dispensing valve connected with the receptacle, a meter disposed at the axis of the indicator and driven therefrom, a clutch for connecting the indicator with the meter normally unclutched, a clutch operating lever, and slide rod operated by the opening of the dispensing valve and having a cam face for operating the clutch lever to connect the indicator and the meter.

3. In a fluid dispenser, the combination of a movable measure indicator, a receptacle for the liquid, means for operating the indicator when liquid is dispensed from the receptacle, a dispensing valve connected with the receptacle, a meter disposed at the axis of the indicator and driven therefrom, a clutch for connecting the indicator with the meter normally unclutched, a clutch operating lever, a slide rod actuated by the dispensing valve and having a cam face for operating the clutch lever to connect the indicator and meter, and locking means controlled by the indicator to limit the travel of said rod.

4. In a fluid dispenser, the combination of a visible liquid receptacle, a float in said receptacle, a pulley in the receptacle, a flexible connection passing over the pulley and having one end attached to the float and its other end extending downward through a tube within the receptacle and depending below the receptacle, a support below the receptacle, a revolving indicating measuring wheel mounted on the support and around which the depending end of the connection is wound in a counter-clockwise direction, a second flexible connection wound on the wheel in a clockwise direction, and extending downwardly therefrom in substantially the vertical plane of the first connection, a counterweight attached to the second flexible connection, a meter, a clutch for connecting the wheel and the meter, a dispensing valve connected with receptacle, a hand lever for operating the dispensing valve, and means operated by the hand lever for operating the clutch to connect the meter and the wheel when the valve is opened and to disconnect them when the valve is closed.

In testimony whereof I affix my signature.

JOHN J. CATRON.